(12) United States Patent  (10) Patent No.: US 12,394,337 B2
Ikarashi  (45) Date of Patent: Aug. 19, 2025

(54) IN-MOLD LABEL AND LABELED CONTAINER

(71) Applicant: YUPO CORPORATION, Tokyo (JP)

(72) Inventor: Takuya Ikarashi, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 51 days.

(21) Appl. No.: 18/683,909

(22) PCT Filed: Aug. 26, 2022

(86) PCT No.: PCT/JP2022/032261
§ 371 (c)(1),
(2) Date: Feb. 15, 2024

(87) PCT Pub. No.: WO2023/027180
PCT Pub. Date: Mar. 2, 2023

(65) Prior Publication Data
US 2024/0363030 A1    Oct. 31, 2024

(30) Foreign Application Priority Data
Aug. 27, 2021 (JP) ................. 2021-139343
Feb. 8, 2022 (JP) ................. 2022-017934

(51) Int. Cl.
G09F 3/02 (2006.01)
B65D 1/02 (2006.01)
B65D 23/08 (2006.01)
G09F 3/10 (2006.01)

(52) U.S. Cl.
CPC ............ G09F 3/02 (2013.01); B65D 1/02 (2013.01); B65D 23/08 (2013.01); G09F 3/10 (2013.01); B65D 2203/02 (2013.01); G09F 2003/023 (2013.01); G09F 2003/0273 (2013.01)

(58) Field of Classification Search
CPC ........ G09F 3/02; G09F 3/10; G09F 2003/023; G09F 2003/0273; G09F 3/04; G09F 2003/0222; B65D 1/02; B65D 23/08; B65D 2203/02; B65D 1/00; B65D 23/00; B65D 25/20; Y02W 30/62
See application file for complete search history.

(56) References Cited

U.S. PATENT DOCUMENTS 6,042,930 A * 3/2000 Kelch .................. B32B 27/32
156/308.2
2007/0218227 A1 9/2007 Nishizawa et al.

FOREIGN PATENT DOCUMENTS

| GB | 2489775 A | 10/2012 |
| JP | 2006-048016 A | 2/2006 |
| JP | 2006-293386 A | 10/2006 |

(Continued)

OTHER PUBLICATIONS

Machine translation of WO-0021060-A1 (Year: 2000).*
ISR issued in International Patent Application No. PCT/JP2022/032261, dated Oct. 11, 2022, translation.

Primary Examiner — Patricia L. Nordmeyer
(74) Attorney, Agent, or Firm — GREENBLUM & BERNSTEIN, P.L.C.

(57) ABSTRACT

There is provided an in-mold label that is easily peeled from a resin container during recycling. The in-mold label has an absolute value of an area dimension change rate of 1% or less at 80° C. and a tack force of 0.8 N/cm² or less at 80° C. The in-mold label can be adhered to a resin container that is a stretch blow-molded body.

14 Claims, 2 Drawing Sheets

(56) References Cited

FOREIGN PATENT DOCUMENTS

| | | | |
|---|---|---|---|
| JP | 2007-264373 A | 10/2007 | |
| JP | 2011-118102 A | 6/2011 | |
| JP | 2018-060185 A | 4/2018 | |
| JP | 2019-059502 A | 4/2019 | |
| WO | WO-0021060 A1 * | 4/2000 | ............... G09F 3/10 |
| WO | 2018/062214 A1 | 4/2018 | |

* cited by examiner

IN-MOLD LABEL AND LABELED CONTAINER

TECHNICAL FIELD

The present invention relates to an in-mold label and an labeled container.

BACKGROUND ART

As the label of a resin container molded using a mold, an in-mold label that adheres to the surface of a resin container by heat during molding is known. In order to increase adhesive strength to a resin container, usually, it is necessary to design the heat sealing layer of an in-mold label according to the physical properties of the material of the resin container (see, for example, Patent Literature 1).

On the other hand, from the viewpoint of environmental protection, the recycling of used resin containers is actively performed. During recycling, labels that do not adhere to the surfaces of resin containers, for example, wrap-around labels and shrink labels, are mechanically peeled, and only the resin containers are collected. But, generally, an in-mold label has strong adhesive strength to a resin container and is not easily peeled by human power, mechanical impact, or the like during recycling. Thus, a collected labeled container may be immersed in a high temperature alkali aqueous solution for a certain time in the process of recycling to peel the label (see, for example, Patent Literature 2).

CITATION LIST

Patent Literature

Patent Literature 1: Japanese Patent Laid-Open No. 2018-060185
Patent Literature 2: Japanese Patent Laid-Open No. 2011-118102

SUMMARY OF INVENTION

Technical Problem

When an in-mold label can be mechanically peeled, recycling is easy, but when the label has adhesive strength at which peeling is easy, the label peels easily even in a usual use state during the storage and conveyance of a labeled container, and the like.

When a labeled container is immersed in a high temperature alkali aqueous solution during recycling, there is no problem even if the adhesive strength of the label is strong. Therefore, both peeling resistance and recyclability can be achieved. But the alkali aqueous solution needs neutralization treatment, and therefore the process control is complicated, and the cost required for recycling rises. In addition, when the label components dissolve in the alkali solution, there is also a possibility that the resin container is contaminated during immersion in the alkali solution, which is a factor of an increase in impurities in the recycled article.

It is an object of the present invention to provide an in-mold label that is easily peeled from a resin container during recycling.

Solution to Problem

The present inventors have studied diligently in order to solve the above problems, and as a result found that the above problems can be solved by adjusting the tack force and the absolute value of the area dimension change rate of an in-mold label at high temperature to particular values or less, and completed the present invention.

Specifically, the present invention is as follows.

[1] An in-mold label for being adhered to a resin container that is a stretch blow-molded body, the in-mold label having
an absolute value of an area dimension change rate of 1% or less at 80° C. and
a tack force of 0.8 N/cm$^2$ or less at 80° C.

[2] The in-mold label according to the above [1], having a tack force of 1 N/cm$^2$ or less at 90° C.

[3] The in-mold label according to the above [1] or [2], including:
a heat sealing layer that adheres to the resin container, wherein
the heat sealing layer contains a thermoplastic resin having a melting point of 90 to 110° C.

[4] The in-mold label according to the above [1] or [2], including:
a heat sealing layer that adheres to the resin container, wherein
a fusion rate of the heat sealing layer at 80° C. is 75% or less, and a fusion rate of the heat sealing layer at 100° C. is 70% or more.

[5] The in-mold label according to the above [3], wherein the heat sealing layer includes a first heat sealing layer, and a second heat sealing layer that adheres to the resin container, and
the first heat sealing layer contains a nonpolar resin having a melting point of 90 to 110° C.

[6] The in-mold label according to the above [3], wherein the heat sealing layer includes a first heat sealing layer, and a second heat sealing layer that adheres to the resin container, and
the second heat sealing layer contains a polar resin having a melting point of 90 to 110° C.

[7] A labeled container including:
a resin container that is a stretch blow-molded body; and
an in-mold label adhering to a surface of the resin container, wherein
an absolute value of an area dimension change rate of the in-mold label at 80° C. is 1% or less, and
a tack force of the in-mold label at 80° C. is 0.8 N/cm$^2$ or less.

[8] The labeled container according to the above [7], wherein
an absolute value of an area dimension change rate of the resin container at 80° C. is 4% or more.

Advantageous Effect of Invention

According to the present invention, an in-mold label that is easily peeled from a resin container during recycling can be provided.

DESCRIPTION OF EMBODIMENTS

Figure 1A:
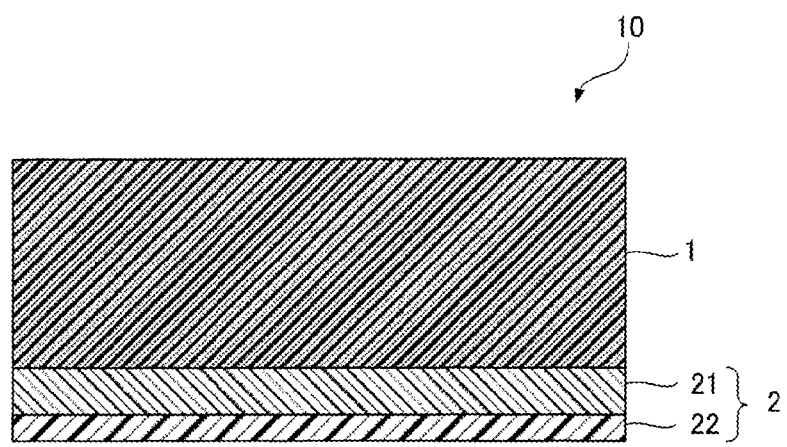
FIG. 1A is a cross-sectional view showing one example of an in-mold label.

The in-mold label and labeled container of the present invention will be described in detail below. The following description provides one example (typical example) of the present invention, and the present invention is not limited to this.

In the following description, the description "(meth) acrylic" indicates both acrylic and methacrylic.

(In-Mold Label)

The in-mold label of the present invention has an absolute value of an area dimension change rate of 1% or less at 80° C. and a tack force of 0.8 N/cm² or less at 80° C. The above area dimension change rate is obtained as the change rate (%) of the product of the dimensions of the in-mold label in the TD (Transverse Direction) direction and the MD (Machine Direction) direction when the temperature changes from 0° C. to 80° C. A detailed measurement method will be described later.

Generally, an in-mold label is placed in a mold used for the in-mold molding of a resin container, melts by heat during the molding, and adheres to the surface of the resin container. Therefore, the in-mold label adheres to the resin container on its whole surface, and peeling by mechanical means is not easy. Accordingly, in order to peel the label from the resin container, high temperature immersion treatment in which the labeled container is immersed in high temperature water or a high temperature alkali aqueous solution may be used in the process of recycling. The treatment temperature at this time is usually 80 to 90° C.

The in-mold label of the present invention has a tack force as low as 0.8 N/cm² or less at 80° C. and therefore peels easily from a resin container in high temperature immersion treatment at 80 to 90° C. In addition, the absolute value of the area dimension change rate of the in-mold label of the present invention at 80° C. is 1% or less, and the in-mold label of the present invention hardly shrinks. Thus, for a resin container that has an absolute value of an area dimension change rate exceeding 1% at 80° C. and shrinks, stress due to the shrinkage difference occurs between the resin container and the label, and the label peels easily due to this stress. In this manner, the in-mold label of the present invention designed so that the peelability during high temperature immersion treatment increases can increase the recyclability of a resin container.

Examples of the method of in-mold molding include a blow molding method and an injection molding method. The blow molding is a method of molding a resin container by disposing a mass of a molten tubular raw material resin in a split mold and applying air pressure from the inside to expand the mass of the raw material resin. The injection molding method is a method of molding a resin container by injecting a raw material resin between a depressed portion mold and a raised portion mold. The blow molding method further includes a direct blow method and a stretch blow method. The direct blow method is a method of forming a resin container by heating a raw material resin to the melting point or more to melt it to form a parison, and applying air pressure to the parison in a mold to expand it. The stretch blow method is a method of forming a resin container by disposing a preform previously formed from a raw material resin in a mold, and stretching the preform around the softening point of the raw material resin by a rod and applying air pressure to expand the preform.

In the injection molding method and the direct blow method, a molten resin is molded, and therefore stress due to stretching is less likely to be applied. On the other hand, in the stretch blow method, a semi-molten preform is expanded by strong blow pressure and molded, and therefore stress due to stretching is applied.

Therefore, when a stretch blow-molded body is subsequently heated to around the temperature during molding again, stress occurs, and the stretch blow-molded body tries to shrink opposite to the direction in which it expands. Further, when molding is performed by the stretch blow method using an ester-based resin, particularly polyethylene terephthalate (PET), as a raw material resin, the temperature of the preform and the temperature of stretch blow molding are, for example, 70 to 150° C. and can be 80 to 120° C. or 90 to 115° C. Thus, particularly for a resin container molded by the stretch blow method, shrinkage occurs easily during high temperature immersion treatment, and particularly when the resin container is an ester-based resin container, shrinkage occurs easily during high temperature immersion treatment in which it is heated to 80 to 90° C. Therefore, the difference in area dimension change rate between the resin container and the in-mold label of the present invention widens easily. Thus, the in-mold label of the present invention peels easily from a resin container molded by the stretch blow method and peels more easily from an ester-based resin container. Therefore, the in-mold label of the present invention can be preferably used as a label for a stretch blow-molded body or as a label for an ester-based resin molded body that is a stretch blow-molded body.

The in-mold label of the present invention is preferably a laminated film having a substrate layer and a heat sealing layer on the substrate layer. The adjustment of the tack force of the in-mold label and the adhesive strength of the in-mold label to a resin container is easy by the heat sealing layer adhering to the resin container, and the adjustment of the area dimension change rate is easy by the substrate layer. When the adhesive strength of the in-mold label is low, the in-mold label peels easily, and the recycling of a resin container is easy. But sufficient adhesive strength is necessary so that the in-mold label does not peel in a usual use state during the storage and conveyance of a labeled container, and the like. In the present invention, the adhesive strength can be adjusted by the heat sealing layer so that the in-mold label can also be sufficiently adhered in a usual use state.

From the viewpoint of making easy the adjustment of not only tack force, but adhesive strength in a usual use state, the heat sealing layer preferably includes a first heat sealing layer and a second heat sealing layer.

Figure 1B:
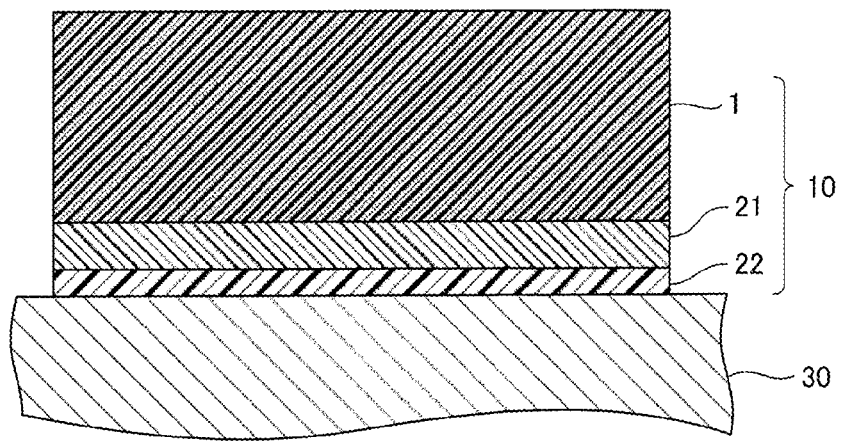
FIG. 1B is a cross-sectional view showing one example of the in-mold label adhering to a resin container.

FIG. 1A and FIG. 1B is a cross-sectional view showing the configuration of an in-mold label 10 that is one embodiment of the present invention.

As shown in FIG. 1A, the in-mold label 10 includes a substrate layer 1, and a heat sealing layer 2 provided on the substrate layer 1. A printed layer can be provided on the surface of the substrate layer 1 opposite to the heat sealing layer 2 by printing. The heat sealing layer 2 includes a first heat sealing layer 21 and a second heat sealing layer 22 in order from the substrate layer 1 side.

As shown in FIG. 1B, the heat sealing layer 2, particularly the second heat sealing layer 22, adheres to a resin container 30 when the in-mold label 10 is stuck to the resin container 30.

The layers will be described below.

<Substrate Layer>

The substrate layer is not particularly limited as long as it can impart strength to the in-mold label. From the viewpoint of water resistance or in-mold moldability, the substrate layer is preferably a thermoplastic resin film.

<<Thermoplastic Resin>>

Examples of the thermoplastic resin that can be used for the substrate layer include olefin-based resins, ester-based resins, vinyl chloride-based resins, amide-based resins, styrene-based resins, and polycarbonate resins. The thermoplastic resin constituting the substrate layer preferably contains an olefin-based resin or an ester-based resin as a main component, and more preferably contains an olefin-based resin as a main component from the viewpoint of cost or mechanical strength. As used herein, the main component refers to a component that accounts for 50% by mass or more of the total of resins.

Examples of the olefin-based resin that can be used for the substrate layer include propylene-based resins and ethylene-based resins. Among these, from the viewpoint of moldability and mechanical strength, propylene-based resins are preferred. From the viewpoint of pore formability described later, an ethylene-based resin is preferably used in combination with a propylene-based resin.

Examples of the propylene-based resins include propylene homopolymers such as isotactic homopolypropylene and syndiotactic homopolypropylene obtained by homopolymerizing propylene, and propylene copolymers obtained by copolymerizing mainly containing propylene and an α-olefin such as ethylene, 1-butene, 1-hexene, 1-heptene, 1-octene, and 4-methyl-1-pentene. The propylene copolymers may be binary or multinary such as ternary or higher, and may be random copolymers or block copolymers.

Examples of the ethylene-based resins include high density polyethylene having a density of 0.940 to 0.965 $g/cm^3$, medium density polyethylene having a density of 0.920 to 0.935 $g/cm^3$, linear low density polyethylene having a density of 0.900 to 0.920 $g/cm^3$, copolymers obtained by copolymerizing mainly containing ethylene and an α-olefin such as propylene, butene, hexene, heptene, octene, or 4-methyl pentene-1, maleic acid-modified ethylene-vinyl acetate copolymers, ethylene-vinyl acetate copolymers, ethylene-acrylic acid copolymers, ethylene-alkyl acrylate ester copolymers, ethylene-alkyl methacrylate ester copolymers, these metal salts (the metals are, for example, zinc, aluminum, lithium, sodium, and potassium) of ethylene-methacrylic acid copolymers, ethylene-cyclic olefin copolymers, or maleic acid-modified polyethylene.

The above olefin-based resins can be used singly or in combinations of two or more thereof.

Examples of the ester-based resin that can be used for the substrate layer include polyethylene terephthalate resins, polybutylene terephthalate resins, or polyethylene naphthalate. Examples of the amide-based resin that can be used for the substrate layer include nylon-6, nylon-6,6, nylon-6, 10, or nylon-6, 12.

The thermoplastic resin used for the substrate layer has a melting point of preferably 110° C. or more, more preferably 130° C. or more, and further preferably 150° C. or more. Thus, the melting of the substrate layer at the temperature of high temperature immersion treatment is prevented to easily maintain the rigidity of the substrate layer during high temperature immersion treatment, and the stretching temperature in the case of stretching is easily set to 90° C. or more, and the thermal shrinkage of the substrate layer is less likely to occur at the temperature of high temperature immersion treatment. Thus, the absolute value of the area dimension change rate of the in-mold label is easily adjusted to 1% or less.

As used herein, the melting point and glass transition point of a resin are measured by Differential Scanning calorimeter (DSC: Differential Scanning calorimetry).

<<Filler>>

The substrate layer can contain a filler. By stretching a thermoplastic resin film containing a filler, pores formed around the filler as a nucleus are easily formed inside the film, and a porous film having a high degree of whiteness or high opacity is easily obtained. The degree of whiteness or opacity of the in-mold label can be adjusted by the type of the filler, the content of the filler, the particle diameter of the filler, film stretching conditions, and the like.

Examples of the filler that can be used for the substrate layer include inorganic fillers or organic fillers. The filler is preferably an inorganic filler from the viewpoint of cost, heat resistance, and the like.

Examples of the inorganic fillers include heavy calcium carbonate, light calcium carbonate, calcined clay, silica, diatomaceous earth, white clay, talc, titanium oxide such as rutile titanium dioxide, barium sulfate, aluminum sulfate, zinc oxide, magnesium oxide, mica, sericite, bentonite, sepiolite, vermiculite, dolomite, wollastonite, and glass fibers. Among these, heavy calcium carbonate, clay, or diatomaceous earth has good pore moldability and is inexpensive and therefore is preferred, and heavy calcium carbonate is more preferred. For the purpose of dispersibility improvement and the like, the surface of the inorganic filler may be surface-treated with a surface treatment agent such as a fatty acid.

When the thermoplastic resin constituting the substrate layer contains an olefin-based resin as a main component, examples of the organic fillers include particles of polyethylene terephthalate, polyethylene naphthalate, polybutylene terephthalate, polyamides, polycarbonates, polystyrene, cyclic olefin homopolymers, ethylene-cyclic olefin copolymers, polyethylene sulfide, polyimides, polymethacrylates, polyethyl ether ketone, polyphenylene sulfide, and melamine resins incompatible with olefin-based resins.

The filler that the substrate layer contains may be one of the above inorganic fillers or organic fillers, or a combination of two or more.

From the viewpoint of increasing the degree of whiteness or opacity of the substrate layer, the content of the filler in the substrate layer is preferably 10% by mass or more, more preferably 15% by mass or more. From the viewpoint of increasing the uniformity of forming the substrate layer, the content of the filler in the substrate layer is preferably 70% by mass or less, more preferably 60% by mass or less, and further preferably 50% by mass or less. Therefore, the content of the filler in the substrate layer is preferably 10 to 70% by mass, more preferably 10 to 60% by mass, and further preferably 15 to 50% by mass.

The average particle diameter of the inorganic filler or the organic filler is preferably 0.01 μm or more, more preferably 0.05 μm or more, and further preferably 0.1 μm or more from the viewpoint of the ease of the formation of pores. From the viewpoint of imparting mechanical strength such as tear resistance, the average particle diameter of the inorganic filler or the organic filler is preferably 15 μm or less, more preferably 5 μm or less, and further preferably 2 μm or less. Therefore, the average particle diameter of the inorganic filler or the organic filler is preferably 0.01 to 15 μm, more preferably 0.05 to 5 μm, and further preferably 0.1 to 2 μm.

The average particle diameter of the inorganic filler is a volume-average particle diameter corresponding to 50% in volume accumulation (cumulative 50% particle diameter) measured by a particle measuring apparatus, for example, a laser diffraction particle diameter distribution measuring apparatus (Microtrac, manufactured by NIKKISO CO., LTD.). The average particle diameter of the organic filler is the average dispersed particle diameter when the organic filler is dispersed in the thermoplastic resin by melting and kneading, and dispersion. For the average dispersed particle diameter, a cut surface of the thermoplastic resin film containing the organic filler is observed by an electron microscope, the maximum diameters of at least 10 particles are measured, and the average dispersed particle diameter can be obtained as their average value.

<<Other Additives>>

The substrate layer can contain additives such as an antioxidant such as a sterically hindered phenol-based, phosphorus-based, amine-based, or sulfur-based antioxidant; a light stabilizer such as a sterically hindered amine-based, benzotriazole-based, or benzophenone-based light stabilizer; a dispersing agent; a lubricant; and an antistatic agent according to the purpose.

The content of the additives in the substrate layer can usually be 0.001 to 3% by mass independently for each type of additive from the viewpoint of suppressing a decrease in printability while obtaining sufficient effects of the additives.

<<Thickness>>

The thickness of the substrate layer is preferably 20 µm or more, more preferably 40 µm or more, from the viewpoint of suppressing the occurrence of creases during printing and making fixation at the target position easy during insertion into the inside of a mold. From the viewpoint of suppressing strength decrease due to the thinning of a resin container in a label boundary portion when providing the in-mold label on the resin container, the thickness of the substrate layer is preferably 200 µm or less, more preferably 150 µm or less. Therefore, the thickness of the substrate layer is preferably 20 to 200 µm, more preferably 40 to 150 µm.

<<Structure>>

The substrate layer may be a single-layer structure or a multilayer structure. In the case of a multilayer structure, the layers can impart various functions such as white opaqueness, adhesiveness to the ink used for the printed layer, heat insulating properties, and easy peelability.

From the viewpoint of the area dimension change rate, the substrate layer is preferably an unstretched film, and is preferably a stretched film stretched at a stretching temperature of 90° C. or more when it is a stretched film. By not performing stretching during the formation of the substrate layer, or performing stretching at 90° C. or more, a temperature higher than the treatment temperature of high temperature immersion treatment, when performing stretching, the absolute value of the area dimension change rate of the in-mold label during high temperature immersion treatment is easily controlled to 1% or less.

On the other hand, it is preferred that the substrate layer is a biaxially stretched film and is relatively thick. When the substrate layer is a biaxially stretched film, the rigidity of the in-mold label is easily increased. High rigidity easily causes repulsion force for a resin container trying to thermally shrink during high temperature immersion treatment, and makes peeling from the resin container easy. The above biaxially stretched film preferably contains a thermoplastic resin having a melting point of 110° C. or more. By the fact that the thermoplastic resin has a melting point of 110° C. or more, the stretching temperature of the biaxially stretched film is set to 90° C. or more to easily reduce shrinkage during high temperature immersion treatment. Further, the thickness of the substrate layer is preferably 20 µm or more, more preferably 40 µm or more, from the viewpoint of the rigidity of the substrate layer.

A commercial product can also be used for the substrate layer. In this case, examples of a suitable transparent substrate layer include a polypropylene-based unstretched film (CPP film), a polypropylene-based biaxially stretched film (BOPP film), a polyethylene terephthalate-based unstretched film (CPET film), and a polyethylene terephthalate-based biaxially stretched film (BOPET film) containing no filler.

Examples of a suitable opaque substrate layer include a CPP film, a BOPP film, a CPET film, a BOPET film, a polyethylene-based unstretched film (CPE film), and a polyethylene-based biaxially stretched film (BOPE film) containing a filler.

<Heat Sealing Layer>

The heat sealing layer imparts adhesiveness to a resin container to the in-mold label. During the in-mold molding of a resin container, the in-mold label is provided inside a mold so that the resin container and the heat sealing layer face each other. The heat sealing layer melts by heat during the in-mold molding, and the in-mold label adheres to the surface of the resin container.

The heat sealing layer may be a single-layer structure or a multilayer structure including a first heat sealing layer and a second heat sealing layer. In the case of a multilayer structure, the tack force and adhesive strength of the in-mold label are easily adjusted by the layers so that the in-mold label is less likely to peel in a usual use state but is easily peeled during high temperature immersion treatment, which is preferred.

<<Heat Sealing Layer Having Single-Layer Structure>>

A heat sealing layer having a single-layer structure can contain a thermoplastic resin having a melting point of preferably 90° C. or more, more preferably 95° C. or more, and further preferably 100° C. or more. When the melting point of the thermoplastic resin used is 90° C. or more, the tack force of the in-mold label is easily kept low at 80 to 90° C. that is the treatment temperature of high temperature immersion treatment. On the other hand, the above heat sealing layer can contain a thermoplastic resin having a melting point of preferably 110° C. or less. When the melting point is 110° C. or less, the thermoplastic resin melts sufficiently easily by heat during molding. Sufficient adhesive strength to a resin container is easily obtained, and the peeling of the in-mold label can be suppressed in a usual use state.

Preferred examples of the thermoplastic resin that can be used for the heat sealing layer include polyethylene-based resins having a melting point of 60 to 130° C. such as low density or medium density polyethylene having a density of 0.900 to 0.935 g/cm$^3$, linear low density polyethylene having a density of 0.880 to 0.940 g/cm$^3$, ethylene-vinyl ester copolymers, ethylene-α,β-unsaturated carboxylic acid (ester) copolymers, and metal salts thereof with Zn, Al, Li, K, Na, and the like. Among these, low density or medium density polyethylene having a degree of crystallinity of 10 to 60% as measured by an X-ray method, and a number-average molecular weight of 10,000 to 40,000, or linear low density polyethylene is preferred.

As the thermoplastic resin of the heat sealing layer, a polar resin is preferably used from the viewpoint of increasing adhesiveness to a resin container, particularly a resin container that is an ester-based resin molded body, and a nonpolar resin is preferably used from the viewpoint of suppressing tack force during high temperature immersion treatment. The polar resin refers to a thermoplastic resin having a polar structural unit, and examples thereof include polymers having a polar structural unit, or copolymers having a polar structural unit and a nonpolar structural unit. Among these, from the viewpoint of the adjustment of adhesive strength to a resin container and tack force, copolymers having a polar structural unit and a nonpolar structural unit are preferred. The nonpolar resin refers to a thermoplastic resin having a nonpolar structural unit.

Examples of the polar structural unit include a vinyl acetate structural unit, a (meth)acrylic acid structural unit, a (meth)acrylate structural unit (the number of carbon atoms of the alkyl group is preferably 1 to 8), a maleic anhydride structural unit, a urethane structural unit, an amide structural unit or a structural unit having a chlorine atom. Among these, a vinyl acetate structural unit, a (meth)acrylic acid structural unit, a (meth)acrylate structural unit, or a maleic anhydride structural unit is preferred.

Examples of the nonpolar structural unit include olefin structural units having 2 to 8 carbon atoms such as an ethylene structural unit or propylene, and among these, an ethylene structural unit is preferred. When the above polar structural unit is copolymerized with polyethylene, the adhesive strength to an ester-based resin container tends to improve.

The polar structural unit in the above copolymer may be a unit in which a nonpolar structural unit is modified with a carboxylic acid. Examples of the modification method include a method of blending a radical-generating agent such as an organic peroxide, and a modifier such as maleic anhydride into a polyolefin resin that is the main skeleton, and kneading the blend in a molten state in an extruder. Examples of the copolymer obtained by this method include maleic acid-modified polyolefin resins.

Preferred examples of the copolymer having a nonpolar structural unit and a polar structural unit include ethylene-vinyl ester copolymers or ethylene-α,β-unsaturated carboxylate copolymer.

Preferred examples of the ethylene-vinyl ester copolymers include ethylene-vinyl acetate copolymers (EVA).

The melt mass flow rate of EVA (JIS K 6924-1:1997) is preferably 1 to 30 g/10 min from the viewpoint of moldability.

The vinyl acetate content of EVA (JIS K 6924-1:1997) is preferably 5 to 40% by mass, more preferably 8 to 30% by mass, from the viewpoint of adhesiveness improvement. As the vinyl acetate content of EVA becomes higher, sufficient polarity is more easily obtained, and the adhesiveness improves more easily. As the vinyl acetate content of EVA becomes lower, flexibility is more easily obtained, and the adhesiveness improves more easily.

The density of EVA (JIS K 6924-2:1997) is preferably 9.30 to 9.50 from the viewpoint of adhesiveness improvement.

Preferred examples of the ethylene-α,β-unsaturated carboxylic acid (ester) copolymers include ethylene-methyl methacrylate copolymers (EMMA) and ethylene-methacrylic acid copolymers (EMAA).

For the heat sealing layer, one of the above-described thermoplastic resins may be used alone, or two or more of the above-described thermoplastic resins may be mixed and used. In the latter case, from the viewpoint of suppressing peeling, the compatibility of the two or more resins mixed is preferably high.

The content of the thermoplastic resin having a melting point of 90 to 110° C. in the heat sealing layer is preferably 30% by mass or more, more preferably 50% by mass or more, further preferably 70% by mass or more, and particularly preferably 90% by mass or more from the viewpoint of the adjustment of tack force and adhesive strength. The content may be 100% by mass but may be below 100% by mass due to containing another thermoplastic resin, or additives described later.

The heat sealing layer preferably contains a tackifier or a plasticizer from the viewpoint of improving adhesiveness to ester-based resin containers, particularly containers of polar resins typified by polyethylene terephthalate resins.

Examples of the tackifier include hydrogenated petroleum resins, aromatic hydrocarbon resins, or aliphatic hydrocarbon resins. Examples of the hydrogenated petroleum resins include partially hydrogenated petroleum resins. Examples of the aromatic hydrocarbon resins include terpene-based resins, rosin-based resins, or styrene-based resins.

One tackifier or plasticizer may be used alone, or two or more tackifiers or plasticizers may be mixed and used. From the viewpoint of suppressing peeling, the compatibility with the thermoplastic resin used for the heat sealing layer is preferably high.

The heat sealing layer can contain additives generally used in the field of polymers, such as an antifogging agent, a lubricant, an antiblocking agent, an antistatic agent, an antioxidant, a heat stabilizer, a light stabilizer, a weathering stabilizer, and an ultraviolet-absorbing agent, as needed.

The content of these additives in the heat sealing layer is usually 0.01 to 5% by mass independently for each type of additive.

The thickness of the heat sealing layer in the case of a single-layer structure is preferably 0.5 μm or more, more preferably 0.7 μm or more, and further preferably 1 μm or more from the viewpoint of increasing adhesiveness. The thickness of the heat sealing layer is preferably 10 μm or less, more preferably 3 μm or less, and further preferably 2 μm or less from the viewpoint of suppressing tack force and the viewpoint of suppressing cohesive failure inside the heat sealing layer. Therefore, the thickness of the heat sealing layer is preferably 0.5 to 10 μm, more preferably 0.7 to 3 μm, and further preferably 1 to 2 μm.

<<Heat Sealing Layer Having Multilayer Structure>>

When the heat sealing layer is a multilayer structure, the second heat sealing layer is the outermost layer of the in-mold label. The first heat sealing layer is located between the second heat sealing layer and the substrate layer and is preferably adjacent to the second heat sealing layer.

<<<First Heat Sealing Layer>>>

The first heat sealing layer can contain a nonpolar resin having a melting point of preferably 90° C. or more, more preferably 95° C. or more, and further preferably 100° C. or more. When the melting point of the nonpolar resin used is 90° C. or more, the tack force of the in-mold label is easily kept low at 80 to 90° C. The above heat sealing layer can contain a nonpolar resin having a melting point of preferably 110° C. or less. When the melting point is 110° C. or less, sufficient adhesive strength to a resin container is easily obtained, and the peeling of the in-mold label can be suppressed in a usual use state. Particularly when the second heat sealing layer is thin, the first heat sealing layer greatly influences the adhesive strength of the whole of the heat sealing layer, and therefore by setting the melting point of the nonpolar resin to 110° C. or less, sufficient adhesiveness to a resin container in a usual use state is easily obtained, which is preferred.

As the nonpolar resin, of thermoplastic resins having the above-described nonpolar structural unit, those having a melting point of 90 to 110° C. can be used. From the viewpoint of adhesive strength, the thermoplastic resin used as the nonpolar resin is preferably an ethylene-based resin, and especially, low density polyethylene having a density of 0.9200 g/cm$^3$ or less, linear low density polyethylene, or an ethylene-propylene copolymer is more preferred, and linear low density polyethylene is most preferred. These ethylene-based resins may be used singly or in combinations of two or more thereof.

Examples of the linear low density polyethylene include linear low density polyethylene synthesized with a multisite catalyst typified by a Ziegler catalyst, and linear low density polyethylene synthesized with a single-site catalyst typified by a metallocene catalyst. From the viewpoint of more accurately controlling the melting behavior of the resin at ambient temperature, linear low density polyethylene synthesized with a single-site catalyst is preferred, and especially, a so-called metallocene catalyst containing a transition metal such as Zr, Ti, or Hf, and an unsaturated ring such as a cyclopentadienyl ring or an indenyl ring is preferred.

As long as the first heat sealing layer is a film in which a nonpolar resin is a main component, the first heat sealing layer may be a film containing 100% by mass of a nonpolar resin, or may contain the tackifier or the plasticizer, and the like mentioned under the heading <<Heat Sealing Layer Having Single-Layer Structure>>, with the content of the nonpolar resin in the film being less than 100% by mass.

<<<Second Heat Sealing Layer>>>

The second heat sealing layer preferably contains a polar resin having a melting point of 90 to 110° C. When the melting point of the polar resin used is 90° C. or more, the tack force of the in-mold label is easily kept lower at 80 to 90° C. than when the polar resin has a melting point of less than 90° C. or when the polar resin has no melting point. When the melting point is 110° C. or less, sufficient adhesive strength to a resin container is easily obtained, and the peeling of the in-mold label can be suppressed in a usual use state.

As the polar resin, of thermoplastic resins having the above-described polar structural unit, or copolymers having a polar structural unit and a nonpolar structural unit, those having a melting point of 90 to 110° C. can be used. By the fact that the polar resin has a melting point of 90° C. or more, the tack force at 80° C. can be adjusted low. Among these, from the viewpoint of the adjustment of tack force and adhesive strength to a resin container, (meth)acrylic acid based copolymers are preferred, and ethylene-methacrylic acid copolymers (EMAA) are more preferred. When the polar resin used is water-soluble, the formation of the second heat sealing layer becomes easy by preparing a coating liquid using an aqueous solvent followed by coating with the coating liquid.

The second heat sealing layer can contain other aid components such as an antistatic agent, a crosslinking accelerator, an antiblocking agent, a pH-adjusting agent, and an antifoaming agent, as needed.

<<Thickness>>

The thickness of the first heat sealing layer is preferably 1 μm or more, more preferably 2 μm or more, from the viewpoint of obtaining sufficient adhesiveness. From the viewpoint of suppressing cohesive failure inside the layer, the thickness of the first heat sealing layer is preferably 5 μm or less, more preferably 3 μm or less.

The thickness of the second heat sealing layer is preferably 0.01 μm or more, more preferably 0.05 μm or more, and further preferably 0.1 μm or more from the viewpoint of obtaining sufficient adhesiveness. On the other hand, the thickness of the second heat sealing layer may be thin from the viewpoint of suppressing tack force during high temperature immersion treatment to make the label peel easily, and is specifically preferably 2 μm or less, more preferably 1.6 μm or less, further preferably 1.2 μm or less, and particularly preferably 1 μm or less.

The total thickness of the first heat sealing layer and the second heat sealing layer is preferably 1.5 μm or more, more preferably 1.6 μm or more, and further preferably 1.7 μm or more from the viewpoint of adhesiveness improvement. On the other hand, the total thickness of the first heat sealing layer and the second heat sealing layer is preferably 8 μm or less, more preferably 6 μm or less, and further preferably 4 μm or less from the viewpoint of peelability from a resin container.

The content of the polar resin in the heat sealing layer is preferably 50 parts by mass or less, more preferably 40 parts by mass or less, and further preferably 10 parts by mass or less based on 100 parts by mass of the nonpolar resin. When the content of the polar resin is the above upper limit value or less, the tack force at the temperature during high temperature immersion treatment is easily suppressed.

(Physical Properties of In-Mold Label)

<Tack Force>

The tack force of the in-mold label of the present invention at a temperature of 80° C. is 0.8 N/cm$^2$ or less, preferably 0.75 N/cm$^2$ or less, and more preferably 0.7 N/cm$^2$ or less. As the tack force at 80° C. becomes lower, the in-mold label peels more easily from a resin container during high temperature immersion treatment, and the resin container is more easily recycled. The tack force is, for example, 0.01 N/cm$^2$ or more.

In the same manner, from the viewpoint of even more easily peeling the in-mold label during recycling, the tack force of the in-mold label of the present invention at a temperature of 90° C. is preferably less than 1.2 N/cm$^2$, more preferably 1 N/cm$^2$ or less. The tack force is, for example, 0.6 N/cm$^2$ or more.

On the other hand, from the viewpoint of sufficiently adhering the in-mold label to a resin container during in-mold molding, the tack force of the in-mold label of the present invention at a temperature of 100° C. is preferably 1.2 N/cm$^2$ or more and is, for example, 8 N/cm$^2$ or less.

The above tack force can be measured, for example, by a tacking tester TAC-II (manufactured by RHESCA CO., LTD.).

<Area Dimension Change Rate>

The absolute value of the area dimension change rate of the in-mold label of the present invention at a temperature of 80° C. is 1% or less. As the area dimension change rate becomes smaller, stress occurs more easily between the in-mold label and a resin container that shrinks easily, and the label peels more easily from the resin container in high temperature immersion treatment.

In the same manner, from the viewpoint of easily peeling the in-mold label during recycling, the absolute value of the area dimension change rate of the in-mold label of the present invention at a temperature of 90° C. is also preferably 1% or less.

The above area dimension change rate is measured as follows.

The in-mold label is cut in the form of a 50 mm×5 mm strip, placed in Thermal Mechanical Analyzer (TMA: Thermal Mechanical Analysis), and cooled to around 0° C., and then the temperature is raised to 120° C. at 10° C./min. The dimension in the TD direction before temperature rise and the dimension in the TD direction at a temperature to be measured, for example, 80° C., after temperature rise are measured. The dimension in the MD direction is measured in the same manner, and the proportion of the amount of change in the product of the dimension in the TD direction and the dimension in the MD direction before and after temperature rise to the product of the dimension in the TD direction and the dimension in the MD direction before temperature rise is calculated. This proportion has a positive sign when the in-mold label shrinks after temperature rise, and has a negative sign when the in-mold label expands after temperature rise. By changing the temperature after temperature rise from 80° C. to 90° C., the area dimension change rate at 90° C. can be obtained in the same manner.

<Fusion Rate>

In the in-mold label of the present invention, the fusion rate of the heat sealing layer at a temperature of 80° C. is preferably 75% or less, more preferably 70% or less, and further preferably 65% or less. When the fusion rate is 75% or less, the tack force is easily kept low at the temperature during high temperature immersion treatment. The above fusion rate at 80° C. is, for example, 1% or more.

In the same manner, from the viewpoint of keeping tack force low, the fusion rate of the heat sealing layer at a temperature of 90° C. is preferably 80% or less, more preferably 75% or less. The fusion rate is, for example, 60% or more.

On the other hand, from the viewpoint of sufficiently adhering the in-mold label, the fusion rate of the heat sealing layer at a temperature of 100° C. is preferably 70% or more, more preferably 75% or more, further preferably 80% or more, still further preferably 85% or more, and particularly preferably 90% or more. The fusion rate is, for example, 100% or less.

The above fusion rate is measured by DSC.

<Adhesive Strength>

The adhesive strength of the in-mold label of the present invention to a resin container is preferably 100 gf/15 mm or more, more preferably 150 gf/15 mm or more, and further preferably 250 gf/15 mm or more from the viewpoint of suppressing peeling from the resin container in a usual use state. From the viewpoint of easily peeling the in-mold label from the resin container in high temperature immersion treatment, the above adhesive strength is preferably 600 gf/15 mm or less, more preferably 450 gf/15 mm or less, and further preferably 350 gf/15 mm or less.

The above adhesive strength is measured according to JIS K6854-2:1999 "Adhesives-Determination of peel strength of bonded assemblies-Part 2:180° peel". The measurement is performed under a situation in which no blisters (bubbles) occur between the resin container and the label.

(Method for Manufacturing In-Mold Label)

The method for manufacturing the in-mold label is not particularly limited, and the in-mold label can be manufactured by molding and laminating films of layers.

<Film Molding>

Examples of the method for molding films include extrusion (cast molding) by a T-die, inflation molding by an O-die, and calendering by a rolling roll.

Examples of the method for laminating films include a coextrusion method, an extrusion lamination method, a coating method, and a film bonding method, and these can also be combined.

In the coextrusion method, a thermoplastic composition for a substrate layer and a thermoplastic composition for a heat sealing layer (there may be a plurality of thermoplastic compositions for each) are supplied to a multilayer die, laminated in the multilayer die, and extruded, and therefore lamination is performed simultaneously with molding.

In the extrusion lamination method, a substrate layer is previously molded, a molten thermoplastic composition for a heat sealing layer is extruded and laminated on the substrate layer, and the laminate is nipped by a roll while being cooled, and therefore molding and lamination are performed in separate steps.

In the coating method, a film is formed and laminated by preparing a coating liquid such as a dispersion of the resin composition of a heat sealing layer and coating a substrate layer with the coating liquid.

In the film bonding method, a substrate layer and a heat sealing layer are each film-molded, and both are bonded via a pressure-sensitive adhesive, and therefore molding and lamination are performed in separate steps.

Among these methods, the coextrusion method is preferred from the viewpoint of being able to strongly adhere the layers.

When the heat sealing layer is a multilayer structure, for example, it is possible to laminate a first heat sealing layer on a substrate layer by the coextrusion method and further laminate a second heat sealing layer by the coating method. Examples of the coating method include a solvent coating method or an aqueous coating method. In the aqueous coating method using an aqueous solvent for a coating liquid, process control is easy, and the aqueous coating method is preferred.

<Stretching>

Examples of the stretching method include a longitudinal stretching method using the peripheral speed difference of a group of rolls, a transverse stretching method using a tenter oven, a sequential biaxial stretching method combining these, a rolling method, a simultaneous biaxial stretching method by a combination of a tenter oven and a pantograph, and a simultaneous biaxial stretching method by a combination of a tenter oven and a linear motor. A simultaneous biaxial stretching (inflation molding) method in which a molten resin is extruded in the form of a tube using a circular die connected to a screw extruder, and then air is blown into the extrudate, and the like can also be used.

The substrate layer and the heat sealing layer may be individually stretched before the layers are laminated, or stretched together after being laminated. The stretched layers may be stretched again after lamination.

When the thermoplastic resins used for the layers are non-crystalline resins, the stretching temperature when stretching is carried out is preferably in the range of the glass transition points of the thermoplastic resins or more. The stretching temperature when the thermoplastic resins are crystalline resins is preferably within the range of the glass transition points of the non-crystalline portions of the thermoplastic resins or more and the melting points of the crystalline portions of the thermoplastic resins or less, and specifically a temperature 2 to 60° C. lower than the melting points of the thermoplastic resins is preferred.

The stretching speed of the film is not particularly limited but is preferably within the range of 20 to 350 m/min from the viewpoint of stable stretch-molding.

The stretching ratios of the films can also be appropriately determined considering the properties of the thermoplastic resins used, and the like. For example, when a thermoplastic resin film containing a homopolymer of propylene or a copolymer thereof is stretched in one direction, its stretching ratio is usually about 1.2 times or more, preferably 2 times or more, and on the other hand, usually 12 times or less, preferably 10 times or less. The stretching ratio in the case of biaxial stretching is usually 1.5 times or more, preferably 10 times or more, and on the other hand, usually 60 times or less, preferably 50 times or less, in terms of area stretching ratio.

Within the above range of the stretching ratio, the target porosity is obtained, and the opaqueness improves easily. In addition, the breakage of the films is less likely to occur, and stable stretch-molding tends to be possible.

The films may be activated by activation treatment from the viewpoint of increasing the adhesiveness to the adjacent layers. Examples of the activation treatment include corona discharge treatment, flame treatment, plasma treatment, glow discharge treatment, or ozone treatment. Among these, corona discharge treatment or flame treatment are preferred, and corona treatment is more preferred.

A printed layer can be provided on the surface of the substrate layer of the in-mold label opposite to the heat sealing layer by printing. Examples of the printed information include the indication of a product, such as a trade name and a logo, a manufacturer, a sales company name, a method of use, and a bar code. Examples of the printing method include gravure printing, offset printing, flexographic printing, seal printing, and screen printing.

<Label Processing>

The in-mold label of the present invention is processed into a necessary shape and necessary dimensions by cutting or punching. The cutting or punching can also be performed before printing but is preferably performed after printing in terms of the ease of work.

(Labeled Container)

In the labeled container of the present invention, the in-mold label of the present invention described above adheres to the surface of a resin container that is a stretch blow-molded body. As described above, the in-mold label of the present invention is particularly easily peeled from a stretch blow-molded body at the temperature of high temperature immersion treatment during recycling, and the recyclability of the resin container increases, and therefore the in-mold label of the present invention can be particularly preferably used as a label for a stretch blow-molded body.

A stretch blow-molded body is molded into a predetermined shape by heating a preform of a raw material resin to the softening point lower than its melting point and then stretching the preform by strong blow pressure. A molded body stretched during molding in this manner tries to shrink in the direction in which it is stretched, when placed again at a temperature around the molding temperature (stretching temperature). The molding temperature is often, for example, about 70 to 150° C., though it depends on the type of the raw material resin. Therefore, at a high temperature of 80 to 90° C. of high temperature immersion treatment, a stretch blow-molded body shrinks easily. When the in-mold label of the present invention that hardly shrinks at the temperature and has small tack force is used, the label peels easily and is easily removed, and therefore the recyclability of a resin container is very easy.

Examples of the raw material resin for which the stretch blow method is selected include ester-based resins such as polyethylene terephthalate. In the in-mold label of the present invention, an olefin-based resin film having low cost and excellent in moldability and mechanical strength can be preferably used as the substrate layer, but olefin-based resins usually have low adhesive strength to ester-based resins. In the present invention, for example, by using a polar resin for the heat sealing layer, the adhesiveness is also good to ester-based resins that are also polar resins, and sufficient adhesive strength is easily obtained in a usual use state.

<Resin Container>

The absolute value of the area dimension change rate of the resin container at a temperature of 80° C. is preferably 4% or more, preferably 6% or more. As the absolute value of the area dimension change rate of the resin container becomes larger, and the difference from the area dimension change rate of the in-mold label becomes wider, the label peels easily during high temperature immersion treatment.

The above area dimension change rate (%) of the resin container is measured as follows.

The resin container is cut in the form of a 50 mm×5 mm strip, placed in TMA, and cooled to around 0° C., and then the temperature is raised to 120° C. at 10° C./min. The dimension in the horizontal direction before temperature rise and the dimension in the horizontal direction at a temperature to be measured, for example, 80° C., after temperature rise are measured. The dimension in the height direction is measured in the same manner, and the proportion of the amount of change in the product of the dimension in the horizontal direction and the dimension in the height direction before and after temperature rise to the product of the dimension in the horizontal direction and the dimension in the height direction before temperature rise is calculated. This proportion has a positive sign when the resin container shrinks after temperature rise, and has a negative sign when the resin container expands after temperature rise.

As long as the resin container can be molded by the stretch blow method, its raw material resin is not particularly limited. Especially, the in-mold label according to the present invention can be preferably used for containers of resins such as ester-based resins such as polyethylene terephthalate (PET), polybutylene terephthalate, polybutylene succinate, or polylactic acid. Examples of resin containers that can be used also include containers of other resins such as polycarbonate resins, acrylonitrile-styrene (AS) resins, acrylonitrile-butadiene-styrene (ABS) resins, and methyl methacrylate-styrene (MS) resins because the adhesion mechanism is the same as for ester-based resins.

The color of the resin container may be transparent or a natural color having no color of a color material such as a pigment or a dye, or may be an opaque color due to a color material or coloration.

The cross-sectional shape of the body of the resin container may be a true circle or may be an ellipse or a rectangle. When the cross-sectional shape of the body is a rectangle, the corners preferably have a curvature. From the viewpoint of strength, the cross section of the body is preferably a true circle or an ellipse close to a true circle, more preferably a true circle.

(Method for Manufacturing Labeled Container)

The labeled container of the present invention can be manufactured by in-mold-molding a resin container by the stretch blow method and sticking an in-mold label to the surface of the resin container during this molding.

In the stretch blow method, a preform of a raw material resin is formed by injection molding or the like. The preform is heated to around the softening point of the raw material resin, and stretched by a rod and stretched by blow pressure in a mold, and a resin container is molded.

The absolute value of the area dimension change rate of the stretch blow-molded body can be adjusted by molding conditions such as molding temperature, blow pressure, or blow time. As the absolute value of the area dimension change rate becomes larger, a shrinkage difference from the label occurs more easily, and the label peels more easily. The optimum molding conditions differ depending on the raw material resin. For example, in the case of polyethylene terephthalate, from the viewpoint of the peeling of the label, the molding temperature is preferably 95° C. or more and usually 110° C. or less. The blow pressure is preferably 2.3

MPa or more and usually 3.5 MPa or less. The blow time is preferably 3 seconds or more and usually 9 seconds or less.

EXAMPLES

The present invention will be more specifically described below by giving Examples, but the present invention is not limited to the following Examples. The descriptions "parts", "%", and the like in the Examples mean descriptions on a mass basis unless otherwise noted.

Example 1

<Manufacture of In-Mold Label>

As the material of a substrate layer, 60% by mass of a thermoplastic resin (propylene homopolymer, trade name: NOVATEC PP FY4, manufactured by Japan Polypropylene Corporation, MFR (230° C., 2.16 kg load): 5 g/10 min, melting point: 167° C.), 10% by mass of a thermoplastic resin (high density polyethylene (trade name: NOVATEC HD HJ360, manufactured by Japan Polyethylene Corporation, MFR (190° C., 2.16 kg load): 5 g/10 min, melting point 131° C.)), and 30% by mass of a filler (heavy calcium carbonate fine powder, trade name: SOFTON #1800, manufactured by Bihoku Funka Kogyo Co., Ltd., volume-average particle diameter: 1.8 µm) were mixed to prepare a resin composition (a1).

As the material of a first heat sealing layer, a resin composition (b1) containing 100% by mass of a nonpolar resin (an ethylene α-olefin copolymer that is very low density polyethylene (VLDPE), trade name: Excellen EUL830, manufactured by Sumitomo Chemical Co., Ltd., MFR (190° C., 2.16 kg load): 22 g/10 min, melting points: 78° C. and 109° C., density: 0.895 g/cm$^3$) was prepared.

The resin composition (a1) for a substrate layer was melted and kneaded by an extruder set to 230° C., then supplied to an extrusion die set to 250° C., and extruded in the form of a sheet. Then, the extrudate was cooled by a cooling apparatus, and the obtained unstretched sheet was heated to 140° C. and stretched 4 times in the MD direction. The resin composition (b1) for a first heat sealing layer was melted and kneaded by another extruder set to 230° C., and then extruded in the form of a sheet to form a first heat sealing layer, and the first heat sealing layer was laminated on the above 4-times stretched film. Thus, a laminated film having a two-layer structure of substrate layer/first heat sealing layer was obtained. The above laminated film was cooled to 60° C., and heated to about 140° C. again and stretched 10 times in the TD direction using a tenter oven. The laminated film was subjected to heat treatment by a heat setting zone adjusted to 160° C., and then cooled to 60° C., and the edge portions were slit.

On the other hand, as a coating liquid (c1) for second heat sealing layer formation, a dispersion of a polar resin (a dispersion of an ethylene-methacrylic acid copolymer (trade name: AC-3100, manufactured by Japan Coating Resin Corporation, melting point: 90° C.) was provided. The first heat sealing layer of the above laminated film was coated with this coating liquid (c1) by a bar coater. Then, the coated laminated film was dried in an oven having a length of 10 m at a drying temperature set to 80° C., to form a second heat sealing layer in which the amount of the solids of the polar resin was 100% by mass.

Thus, a laminated film having a three-layer structure in which substrate layer/first heat sealing layer/second heat sealing layer was laminated in this order (total thickness: 78.65 µm, layer thickness: 75.5 µm/3 µm/0.15 µm, number of stretching axes: 2 axes/1 axis/—) was obtained as an in-mold label.

<In-Mold Molding of Resin Container>

The above in-mold label was cut in the form of a sheet and punched into an 8 cm×6 cm rectangle to fabricate an evaluation sample. This sample was charged using an electrostatic charging apparatus, placed inside the molding mold of a stretch blow molding machine (manufactured by NISSEI ASB MACHINE CO., LTD., equipment name: ASB-12M), and clamped. At this time, the in-mold label was placed so that the substrate layer was in contact with the mold (the second heat sealing layer faced the cavity side). In addition, the in-mold label was placed so that the long sides of the label were parallel to the peripheral direction of the body of a resin container in the mold. The mold was controlled so that the surface temperature on the cavity side was within the range of 20 to 45° C.

Then, a resin container was molded under the following molding conditions (Sb1).

<Molding Conditions (Sb1)>

Figure 2A:
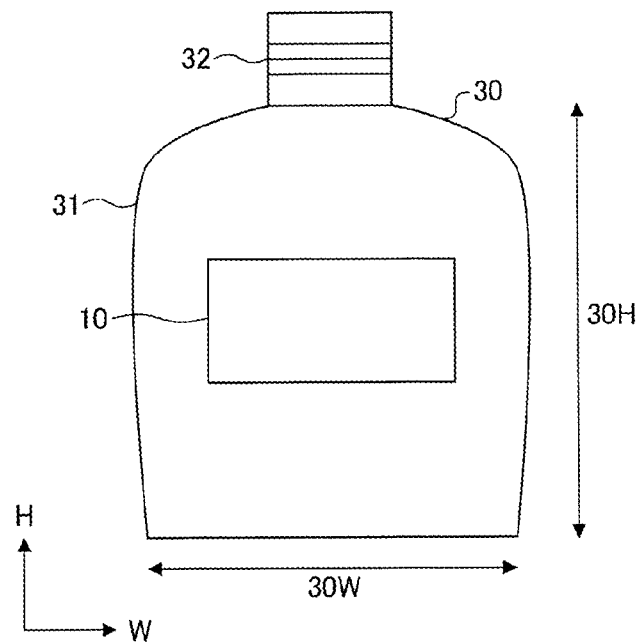
FIG. 2A is a front view of a labeled container.
Figure 2B:
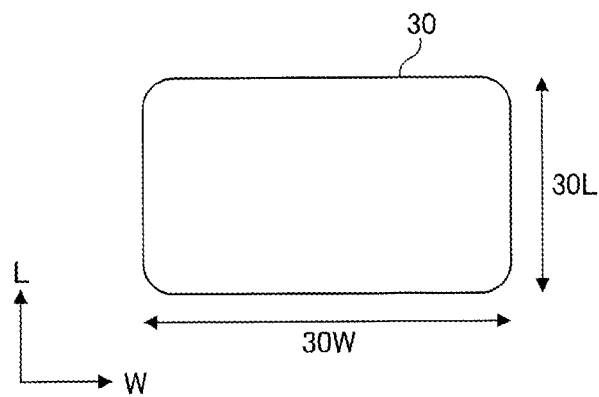
FIG. 2B is a bottom view of the labeled container.

A preform of a polyethylene terephthalate resin was preheated to 98° C., guided to the mold, and stretch blow-molded under a blow pressure of 3.2 MPa for 6 seconds. The molded material was cooled to 50° C. in 5.5 seconds, and then the mold was opened to obtain a labeled container 30 having a square body portion 31 as shown in FIG. 2A and FIG. 2B. The dimension of the body portion in the horizontal direction W, 30W, was 145 mm, the dimension in the depth direction L, 30L, was 72.5 mm, and the dimension in the vertical direction H, 30H, was 130 cm. The dimension 30H was from the bottom surface to the lower side of the cap opening 32.

The stretching ratio of the labeled container 30 was 1.2 times in the horizontal direction W, 2.6 times in the depth direction L, and 1.8 times in the vertical direction H. The stretching ratios were obtained as the ratios of the dimensions 30W, 30L, and 30H of the labeled container 30 to the dimensions of the preform in the horizontal direction W, the depth direction L, and the vertical direction H. The body portion 31 of the labeled container bulges more than the bottom surface, and therefore the dimensions 30W and 30L were measured with the positions in the vertical direction H changed, and the average values of the measured values were adopted.

Example 2

The labeled container of Example 2 was manufactured in the same manner as Example 1 except that the thickness of the first heat sealing layer was changed to 5 µm.

Example 3

The labeled container of Example 3 was manufactured in the same manner as Example 1 except that the nonpolar resin used for the first heat sealing layer was changed to 100% by mass of metallocene catalyst polyethylene (trade name: Evolue SP0540, manufactured by Prime Polymer Co., Ltd., MFR (190° C., 2.16 kg load): 3.8 g/10 min, melting points: 90° C. and 113° C., density: 0.903 g/cm$^3$).

Example 4

The labeled container of Example 4 was manufactured in the same manner as Example 1 except that the nonpolar resin used for the first heat sealing layer was changed to 100% by mass of metallocene catalyst polyethylene (trade name: Engage 8402, manufactured by The Dow Chemical Company, MFR (190° C., 2.16 kg load): 30 g/10 min, melting point: 97° C., density: 0.902 g/cm$^3$).

Example 5

The labeled container of Example 5 was manufactured in the same manner as Example 1 except that the nonpolar resin used for the first heat sealing layer was changed to 100% by mass of metallocene catalyst polyethylene (trade name: Kernel KS571, manufactured by Japan Polyethylene Corporation, MFR (190° C., 2.16 kg load): 12 g/10 min, melting point: 100° C., density: 0.907 g/cm$^3$).

Example 6

The labeled container of Example 6 was manufactured in the same manner as Example 1 except that the thickness of the second heat sealing layer was changed to 1 μm.

Example 7

The labeled container of Example 7 was manufactured in the same manner as Example 1 except that the nonpolar resin used for the first heat sealing layer was changed to a mixture of 70% by mass of the above ethylene α-olefin copolymer (trade name: Excellen EUL830) and 30% by mass of metallocene catalyst polyethylene (trade name: Engage 8401, manufactured by The Dow Chemical Company, MFR (190° C., 2.16 kg load): 31 g/10 min, melting point: 79° C., density: 0.885 g/cm$^3$).

Example 8

The labeled container of Example 8 was manufactured in the same manner as Example 1 except that the in-mold label was manufactured as follows.

As the material of a substrate layer, a resin composition (a2) containing 70% by mass of a thermoplastic resin (high density polyethylene (trade name: NOVATEC HD HJ360, manufactured by Japan Polyethylene Corporation, MFR: 5 g/10 min, melting point 131° C.) and 30% by mass of a filler (trade name SOFTON #1800) was prepared. The obtained resin composition (a2) was melted and kneaded by an extruder set to 200° C., then supplied to an extrusion die set to 230° C., and extruded in the form of a sheet. Then, the extrudate was cooled by a cooling apparatus, and the obtained unstretched sheet was heated to 110° C. and stretched 4 times in the MD direction.

A first heat sealing layer was formed on the above 4-times stretched film in the same manner as Example 1. The obtained laminated film was cooled to 60° C., and heated to about 120° C. again and stretched 10 times in the TD direction using a tenter oven. The laminated film was subjected to heat treatment by a heat setting zone adjusted to 130° C., and then cooled to 60° C., and the edge portions were slit. Then, a second heat sealing layer was formed in the same manner as Example 1. Thus, a laminated film having a three-layer structure in which substrate layer/first heat sealing layer/second heat sealing layer was laminated in this order (total thickness: 78.65 μm, layer thickness: 75.5 μm/3 μm/0.15 μm, number of stretching axes: 2 axes/1 axis/—) was obtained as an in-mold label.

Example 9

The labeled container of Example 9 was manufactured in the same manner as Example 1 except that the molding conditions (Sb1) of the resin container were changed to the following molding conditions (Sb2).
<Molding Conditions (Sb2)>
A preform of a polyethylene terephthalate resin was preheated to 112° C., guided to the mold, and stretch blow-molded under a blow pressure of 3.2 MPa for 6 seconds. Then, the molded material was cooled to 50° C. in 3.5 seconds. The mold was opened to obtain a labeled container having a square body portion having the same dimensions as Example 1. The dimensions and stretching ratios of the labeled container were the same as Example 1.

Example 10

The labeled container of Example 10 was manufactured in the same manner as Example 1 except that the molding conditions (Sb1) of the resin container were changed to the following molding conditions (Sb3).
<Molding Conditions (Sb3)>
A preform of a polyethylene terephthalate resin was preheated to 99° C., guided to the mold, and stretch blow-molded under a blow pressure of 2.8 MPa for 6 seconds. Then, the molded material was cooled to 50° C. in 5.5 seconds. The mold was opened to obtain a labeled container having a square body portion having the same dimensions as Example 1. The dimensions and stretching ratios of the labeled container were the same as Example 1.

Example 11

The labeled container of Example 11 was manufactured in the same manner as Example 1 except that the molding conditions (Sb1) of the resin container were changed to the following molding conditions (Sb4).

Example 12

75% by mass of a thermoplastic resin (propylene homopolymer, trade name: NOVATEC PP FY4, manufactured by Japan Polypropylene Corporation, MFR (230° C., 2.16 kg load): 5 g/10 min, melting point: 167° C.) and 25% by mass of a thermoplastic resin (high density polyethylene (trade name: NOVATEC HD HJ360, manufactured by Japan Polyethylene Corporation, MFR (190° C., 2.16 kg load): 5 g/10 min, melting point 131° C.)) were mixed to prepare a resin composition (a3). The labeled container of Example 12 was manufactured in the same manner as Example 4 except that the resin composition (a3) was the material of the substrate layer.

Example 13

The resin composition (a1) for a substrate layer prepared in Example 4 was melted and kneaded by an extruder set to 230° C., then supplied to an extrusion die set to 250° C., and extruded in the form of a sheet. The resin composition (b1) for a first heat sealing layer prepared in Example 4 was melted and kneaded by another extruder set to 230° C., and then extruded in the form of a sheet to form a first heat sealing layer, and the first heat sealing layer was laminated on the above extruded sheet. Thus, a laminated film having a two-layer structure of substrate layer/first heat sealing layer was obtained. The obtained laminated film was cooled to 60° C., and the edge portions were slit.

On the other hand, the first heat sealing layer of the above laminated film was coated with the coating liquid for second heat sealing layer formation prepared in Example 4 by a bar coater. Then, the coated laminated film was dried in an oven having a length of 10 m at a drying temperature set to 80° C., to form a second heat sealing layer in which the amount of the solids of the polar resin was 100% by mass.

Thus, a laminated film having a three-layer structure in which substrate layer/first heat sealing layer/second heat sealing layer was laminated in this order (total thickness: 78.65 μm, layer thickness: 68.5 μm/10 μm/0.15 μm, number of stretching axes: 2 axes/1 axis/—) was obtained as an in-mold label. The labeled container of Example 13 was manufactured in the same manner as Example 4 using the obtained in-mold label.

Example 14

The labeled container of Example 14 was manufactured in the same manner as Example 1 except that the nonpolar resin used for the first heat sealing layer was changed to 100% by mass of metallocene catalyst polyethylene (trade name: Kernel KC577T, manufactured by The Dow Chemical Company, MFR (190° C., 2.16 kg load): 15 g/10 min, melting point: 102° C., density: 0.910 g/cm$^3$).
<Molding Conditions (Sb4)>
A sample of an in-mold label fabricated in the same manner as Example 1 was placed in a mold set to 25° C. in a stretch blow molding machine (trade name: PET-2W model, manufactured by YORKEY CO., LTD.). At this time, the in-mold label was placed so that the substrate layer was in contact with the inner wall of the mold, and the in-mold label was mounted and fixed in the mold by reduced pressure suction from a vacuum reduced pressure suction hole. Then, polyethylene terephthalate (trade name: Unipet RT543, manufactured by Japan Unipet Co., Ltd.) previously molded into a preform by an injection molding machine was heated to 100° C. by an infrared heater and guided to the mold. This was stretch blow-molded under a blow pressure of 2.5 MPa for 6 seconds to obtain a cylindrical labeled container in which the dimension in the height direction H was 200 mm, and the length around the body was 210 mm. The stretching ratio of this labeled container was 3.0 times in the horizontal direction W, 2.6 times in the depth direction L, and 2.4 times in the vertical direction H.

Comparative Example 1

The labeled container of Comparative Example 1 was manufactured in the same manner as Example 5 except that the second heat sealing layer was formed using the following coating liquid (c2).
<Preparation of Coating Liquid (c2)>
A reactor having an internal volume of 150 L equipped with a reflux condenser, a nitrogen introduction tube, pumping machine, a thermometer, a dropping funnel, and a heating jacket was charged with 40 kg of isopropanol (manufactured by Tokuyama Corporation, trade name: TOKUSO IPA). While this was stirred, 12.6 kg of N, N-dimethylaminoethyl methacrylate (manufactured by Sanyo Chemical Industries, Ltd., trade name: Methacrylate DMA), 12.6 kg of butyl methacrylate (manufactured by MITSUBISHI RAYON CO., LTD., trade name: Acrylester B), and 2.8 kg of a higher aliphatic alcohol methacrylate (manufactured by MITSUBISHI RAYON CO., LTD., trade name: Acrylester SL, mixture of lauryl methacrylate and tridecyl methacrylate) were introduced into the reactor. Then, nitrogen replacement in the system was performed, and the temperature in the reactor was raised to 80° C., and then 0.3 kg of 2,2'-azobisisobutyronitrile (manufactured by Wako Pure Chemical Industries, Ltd., trade name: V-60 (AIBN)) as a polymerization initiator was introduced into the reactor.

With the temperature in the reactor kept at 80° C., stirring was continued for 4 hours to perform a copolymerization reaction. Then, after cooling to ordinary temperature, 4.3 kg of glacial acetic acid (manufactured by Wako Pure Chemical Industries, Ltd.) was introduced into the reactor to neutralize the obtained copolymer. Then, while 48.3 kg of ion-exchanged water was introduced into the reactor, the isopropanol was distilled off for aqueous replacement in the system, to obtain a viscous aqueous solution (solid concentration 35% by mass) of a methacrylic acid-based copolymer having a tertiary amino group as a polar group in a side chain (having no melting point, weight-average molecular weight 40,000). The obtained methacrylic acid-based copolymer was bonded to a proton and bonded to an acetic acid ion as a cation in the aqueous solution, and therefore it was confirmed that the above polar group was a cationic group. The methacrylic acid-based copolymer having this polar group was diluted with ion-exchanged water to a solid concentration of 10% by mass to prepare the coating liquid (c2).

Comparative Example 2

The labeled container of Comparative Example 2 was manufactured in the same manner as Example 1 except that the nonpolar resin used for the first heat sealing layer was changed to 100% by mass of the above metallocene catalyst polyethylene (trade name: Engage 8401).

Comparative Example 3

The labeled container of Comparative Example 3 was manufactured in the same manner as Example 1 except that without forming the first heat sealing layer, the substrate layer was directly coated with the following coating liquid (c3) to form a second heat sealing layer having a thickness of 4 μm.
<Preparation of Coating Liquid (c3) >
A dispersion of a polar resin (a dispersion of the above ethylene-methacrylic acid copolymer (trade name: AC-3100)) and a binder aqueous solution (polyethylenimine that is a cationic water-soluble binder (trade name: EPOMIN P-1000, manufactured by NIPPON SHOKUBAI CO., LTD., solid concentration: 30% by mass)) were mixed to prepare the coating liquid (c3). The amounts of the liquids blended in the coating liquid (c3) were adjusted so that the amount of the solids of the polar resin in the second heat sealing layer was 80% by mass, and the amount of the solids of the water-soluble binder was 20% by mass.

Comparative Example 4

The labeled container of Comparative Example 4 was manufactured in the same manner as Example 1 except that the polar resin of the second heat sealing layer was changed to an ethylene-vinyl acetate copolymer (EMA) (trade name: Adcoat THS4884, manufactured by Toyo-Morton, Ltd., melting point: 75° C.).

Comparative Example 5

The labeled container of Comparative Example 5 was manufactured in the same manner as Example 1 except that the molding conditions (Sb1) of the resin container were changed to the following molding conditions (Db).

<Molding Conditions (Db)>

A sample of an in-mold label was disposed so that the substrate layer was in contact with the inner wall of a mold set to 15° C. in a molding machine for hollow container manufacture. The in-mold label was fixed to the inner wall of the mold by reduced pressure suction from the vacuum reduced pressure suction hole of the molding machine.

Then, a parison of high density polyethylene (manufactured by Japan Polyethylene Corporation: trade name "HB330") was heated to 180° C., and a blow pressure of 0.5 MPa was applied for 20 seconds to direct blow-mold a resin container. Thus, a labeled container in which the in-mold label adhered to the surface of the resin container was obtained.

(Raw Materials)

Table 1 shows a list of the raw materials used in the Examples and the Comparative Examples.

TABLE 1

| | Type | Symbol | Material |
|---|---|---|---|
| Heat sealing layer | Nonpolar resin | EUL830 | Ethylene a-olefin copolymer that is very low density polyethylene (VLDPE) (trade name: Excellen EUL830, manufactured by Sumitomo Chemical Co., Ltd., MFR (190° C., 2.16 kg load): 22 g/10 min, melting points: 78° C. and 109° C., density: 0.895 g/cm$^3$) |
| | | SP0540 | Metallocene catalyst polyethylene, trade name: Evolue SP0540, manufactured by Prime Polymer Co., Ltd., MFR (190° C., 2.16 kg load): 3.8 g/10 min, melting points: 90° C. and 113° C., density: 0.903 g/cm$^3$ |
| | | KS571 | Metallocene catalyst polyethylene (trade name: Kernel KS571, manufactured by Japan Polyethylene Corporation, MFR (190° C., 2.16 kg load): 12 g/10 min, melting point: 100° C., density: 0.907 g/cm$^3$) |
| | | KC577T | Metallocene catalyst polyethylene (trade name: Kernel KC577T, manufactured by Japan Polyethylene Corporation, MFR (190° C., 2.16 kg load): 15 g/10 min, melting point: 102° C., density: 0.910 g/cm$^3$) |
| | | 8402 | Metallocene catalyst polyethylene (trade name: Engage 8402, manufactured by The Dow Chemical Company, MFR (190° C., 2.16 kg load): 30 g/10 min, melting point: 97° C., density: 0.902 g/cm$^3$) |
| | | 8401 | Metallocene catalyst polyethylene (trade name: Engage 8401, manufactured by The Dow Chemical Company, MFR (190° C., 2.16 kg load): 31 g/10 min, melting point: 79° C., density: 0.885 g/cm$^3$) |
| | Polar resin | AC-3100 | Dispersion of ethylene-methacrylic acid copolymer (EMAA) (trade name: AC-3100, manufactured by Japan Coating Resin Corporation, melting point: 90° C., average particle diameter: 0.7 μm) |
| | | Ac | Acrylic copolymer having polar group (melting point: no) |
| | | THS4884 | Ethylene-vinyl acetate copolymer (EVA) (trade name: Adcoat THS4884, manufactured by Toyo-Morton, Ltd., melting point: 75° C.) |
| | Water-soluble binder | — | Polyethylenimine that is cationic water-soluble binder (trade name: EPOMIN P-1000, manufactured by NIPPON SHOKUBAI CO., LTD., solid concentration: 30% by mass) |
| Substrate layer | Thermoplastic resin | PP | Propylene homopolymer (trade name: NOVATEC PP FY4, manufactured by Japan Polypropylene Corporation, MFR (230° C., 2.16 kg load): 5 g/10 min, melting point: 167° C.) |
| | | PE | High density polyethylene (trade name: NOVATEC HD HJ360, manufactured by Japan Polyethylene Corporation, MFR (190° C., 2.16 kg load): 5 g/10 min, melting point 131° C.) |
| | Filler | 1800 | Heavy calcium carbonate fine powder (trade name: SOFTON #1800, manufactured by Bihoku Funka Kogyo Co., Ltd., volume-average particle diameter: 1.8 μm) |

(Molding Conditions)

Table 2 shows a list of the molding conditions of the resin container in the Examples and the Comparative Examples.

TABLE 2

| No. | Stretch blow molding machine | Cooling time [seconds] | Blow pressure [Mpa] | Blow time [seconds] | Preform surface temperature before blow [° C.] | Stretching ratios of resin container |
|---|---|---|---|---|---|---|
| Sb1 | ASB-12M | 5.5 | 3.2 | 6 | 98 | W: 1.2 times |
| Sb2 | (manufactured | 3.5 | 3.2 | 6 | 112 | L: 2.6 times |
| Sb3 | by NISSEI ASB MACHINE CO., LTD. 1 stage molding) | 5.5 | 2.8 | 6 | 99 | H: 1.8 times |
| Sb4 | PET-2W model (manufactured by YORKEY CO., LTD. 2stage molding) | — | 2.5 | 6 | 100 | W: 3.0 times L: 2.6 times H: 2.4 times |

(Evaluation Methods)
<Thickness>

The thickness (total thickness) of an in-mold label was measured in accordance with JIS K7130: 1999 using a constant pressure thickness gauge (trade name: PG-01J, manufactured by TECLOCK). The thickness of each layer in the in-mold label was obtained as follows. A specimen to be measured was cooled to a temperature of −60° C. or less with liquid nitrogen. A razor blade (trade name: Proline Blade, manufactured by Schick Japan K.K.) was placed at right angles to the specimen placed on a glass plate, and the specimen was cut to fabricate a cross-sectional observation specimen. The cross section of the obtained specimen was observed using a scanning electron microscope (trade name: JSM-6490, manufactured by JEOL Ltd.), and the boundary line for the thermoplastic resin composition of each layer was distinguished from the appearance. The total thickness of the in-mold label was multiplied by the thickness ratio of each layer observed to obtain the thickness of each layer.

<Area Dimension Change Rates of In-Mold Label>

A sample was made by cutting out an in-mold label so that the length in the MD direction was 50 mm, and the length in the TD direction was 5 mm. The fabricated sample was placed in Thermal Mechanical Analysis TMA7100 (manufactured by Hitachi High-Tech Corporation). In TMA7100, the specimen was gripped by a fixture so that the length of the measurement piece was 15 mm, and while a load of 49 N was applied, the temperature was raised under the conditions of a temperature range of 0 to 120° C. and a temperature rise speed of 10° C./min. The dimension in the MD direction at a temperature of 0° C. before temperature rise ($D_M0$) and the dimension in the MD direction after temperature rise ($D_M1$) were measured. After temperature rise, the dimension at temperatures of 75° C., 80° C., and 90° C. was measured. In the same manner, the dimension in the TD direction before temperature rise and after temperature rise ($D_T0$ and $D_T1$) was measured using a sample obtained by cutting out the in-mold label so that the length in the TD direction was 50 mm, and the length in the MD direction was 5 mm.

The area dimension change rates $K_{10}(\%)$ at temperatures of 75° C., 80° C., and 90° C. were obtained from the measured values of the dimensions by the following formula. The area dimension change rate $K_{10}(\%)$ has a negative sign when the in-mold label shrinks after temperature rise, and has a positive sign when the in-mold label expands after temperature rise.

area dimension change rate $K_{10}(\%) =$ $$(D_M0 \times D_T0 - D_M1 \times D_T1)/(D_M0 \times D_T0) \times 100$$

<Fusion Rates of Heat Sealing Layer>

5 mg of a heat sealing layer was sampled and set in Differential Scanning calorimetry DSC7000X (manufactured by Hitachi High-Tech Corporation). In this Differential Scanning calorimetry, a heating/cooling/heating cycle was carried out in the temperature range of −60° C. to 200° C. at a scan speed of 10 m/min to obtain the DSC curve. From the DSC curve in the second heating step, the heat of fusion in the whole of the heating step and the heat of fusion at temperatures of 80° C., 90° C., and 100° C. were obtained, and the heat of fusion at the temperatures was divided by the heat of fusion in the whole of the heating step to obtain the fusion rates.

<Tack Force>

A sample of an in-mold label was set in a tacking tester (TAC-II) (manufactured by RHESCA CO., LTD.). By the tester, a probe made of stainless steel having a diameter of q 5 mm heated to a predetermined temperature was pressed against the surface on the side of the in-mold label to be in contact with a resin container, under a load of 10 N for 30 seconds, and peeled at a peel speed of 30 m/min after 1 min, and the tack force (N/cm$^2$) at this time was measured.

<Adhesive Strength Between Resin Container and In-Mold Label>

Obtained labeled containers were stored in an environment at a temperature of 23° C. and a relative humidity of 50% for 2 days. Next, the portion of each labeled container in which the label was provided was cut off by a cutter to fabricate a sample having a dimension of 12 cm in the horizontal direction W and a dimension of 1.5 cm in the height direction. The label and the resin container were integrally cut off so that in the horizontal direction W, the length of the label-affixed portion was 8 cm, and the length of the unaffixed portion was 4 cm, and so that in the height direction H, the label was affixed across the full width. A total of six samples were fabricated from two resin containers.

Next, the label-affixed portion was carefully peeled from the label-unaffixed portion, and about 1 cm of the label-affixed portion was peeled to form a grip. The grip and a PET film having a width of 1.5 cm (thickness 50 µm) were stacked and adhered with a pressure-sensitive adhesive to form a grip portion on the label side.

The sample in which the above grip portion was formed was set in a tensile tester (model name: Autograph AGS-5 kNJ, manufactured by SHIMADZU CORPORATION). A 180° peel test between the resin container and the label was carried out based on JIS K6854-2:1999 under the condition of a peel speed of 300 mm/min using this tensile tester. The value obtained by measuring the average value of peel force for peel lengths of 25 to 75 mm and further averaging the measured values of the six samples was taken as adhesive strength. The unit of the adhesive strength was gf/15 mm.

<Area Dimension Change Rates of Resin Container>

A sample was fabricated by cutting 50 mm in the horizontal direction W and 5 mm in the vertical direction H from the region whose positions in the horizontal direction W and the height direction H were the same as the region to which the label 10 was stuck, of the surface of the body portion 31 of the labeled container 30 opposite to the surface to which the label 10 was stuck, as shown in FIG. 2A and FIG. 2B. The dimension in the horizontal direction W at a temperature of 0° C. before temperature rise ($D_W0$) and the dimension in the horizontal direction W after temperature rise ($D_W1$) were measured in the same manner as the area dimension change rates $K_{10}$ of the in-mold label using this sample. After temperature rise, the dimension at temperatures of 75° C., 80° C., and 90° C. was measured. In the same manner, the dimension in the vertical direction H before temperature rise and after temperature rise ($D_H0$ and $D_H1$) was measured using a sample cut out from the labeled container 30 so that the length in the vertical direction H was 50 mm, and the length in the horizontal direction W was 5 mm.

The area dimension change rates $K_{30}(\%)$ at temperatures of 75° C., 80° C., and 90° C. were obtained from the measured values of the dimensions by the following formula. The area dimension change rate $K_{30}(\%)$ has a negative sign when the resin container shrinks after temperature rise, and has a positive sign when the resin container expands after temperature rise.

area dimension change rate $K_{30}(\%) =$ $$(D_W 0 \times D_H 0 - D_W 1 \times D_H 1)/(D_W 0 \times D_H 0) \times 100$$

<Label Separation Rates>

The label portion of each of the labeled containers of the Examples and the Comparative Examples was cut off. This label portion was ground in the form of flakes about 8 mm square to fabricate evaluation samples. The samples were introduced into constant temperature water tanks maintaining water temperatures of 75° C., 80° C., and 90° C., and immersed for 10 min while being stirred. The samples were pulled out of the high temperature water and sufficiently dried. In the same manner, the samples were introduced into constant temperature water tanks maintaining the temperature of an alkali solution (sodium hydroxide solution) at 80° C. and 90° C., and immersed for 10 min while being stirred. The samples were pulled out of the high temperature alkali solution, subjected to neutralization treatment, then water-washed, and sufficiently dried. After drying, the numbers of peeling labels were measured.

The label separation rate (%) was calculated by the following formula from the number of samples before immersion and the number of peeling labels after immersion.

label separation rate (%) = number of peeling labels/number of samples before immersion × 100

Table 3 and Table 4 show evaluation results. In Tables 3 and 4, a water-soluble binder is described as "Binder" for convenience.

TABLE 3

| Con-figuration | Detail | Composition | | Examples | | | | | |
|---|---|---|---|---|---|---|---|---|---|
| | | | | 1 | 2 | 3 | 4 | 5 | 6 |
| | Substrate layer | PP | [% by mass] | 60 | 60 | 60 | 60 | 60 | 60 |
| | | PE | [% by mass] | 10 | 10 | 10 | 10 | 10 | 10 |
| | | 1800 | [% by mass] | 30 | 30 | 30 | 30 | 30 | 30 |
| | | Number of stretching axes | | 2 axes | 2 axes | 2 axes | 2 axes | 2 axes | 2 axes |
| | | Stretching temperature | [° C.] | 140 | 140 | 140 | 140 | 140 | 140 |
| | First heat sealing layer | EUL830 | [% by mass] | 100 | 100 | 0 | 0 | 0 | 100 |
| | | SP0450 | [% by mass] | 0 | 0 | 100 | 0 | 0 | 0 |
| | | 8402 | [% by mass] | 0 | 0 | 0 | 100 | 0 | 0 |
| | | 8401 | [% by mass] | 0 | 0 | 0 | 0 | 0 | 0 |
| | | KS571 | [% by mass] | 0 | 0 | 0 | 0 | 100 | 0 |
| | | KC577T | [% by mass] | 0 | 0 | 0 | 0 | 0 | 0 |
| | | Number of stretching axes | | 1 axis | 1 axis | 1 axis | 1 axis | 1 axis | 1 axis |
| | | Thickness | [μm] | 3 | 5 | 3 | 3 | 3 | 3 |
| | Second heat sealing layer | AC3100 | [% by mass] | 100 | 100 | 100 | 100 | 100 | 100 |
| | | Ac | [% by mass] | 0 | 0 | 0 | 0 | 0 | 0 |
| | | THS4884 | [% by mass] | 0 | 0 | 0 | 0 | 0 | 0 |
| | | Binder | [% by mass] | 0 | 0 | 0 | 0 | 0 | 0 |
| | | Thickness | [μm] | 0.15 | 0.15 | 0.15 | 0.15 | 0.15 | 1 |

| Con-figuration | Detail | Composition | | Examples | | | | |
|---|---|---|---|---|---|---|---|---|
| | | | | 7 | 8 | 12 | 13 | 14 |
| | Substrate layer | PP | [% by mass] | 60 | 0 | 75 | 60 | 60 |
| | | PE | [% by mass] | 10 | 70 | 25 | 10 | 10 |
| | | 1800 | [% by mass] | 30 | 30 | 0 | 30 | 30 |
| | | Number of stretching axes | | 2 axes | 2 axes | 2 axes | un-stretched | 2 axes |
| | | Stretching temperature | [° C.] | 140 | MD110 TD120 | 140 | — | 140 |

TABLE 3-continued

| | | | | | | | | |
|---|---|---|---|---|---|---|---|---|
| First heat sealing layer | EUL830 | [% by mass] | 70 | 100 | 0 | 0 | 0 |
| | SP0450 | [% by mass] | 0 | 0 | 0 | 0 | 0 |
| | 8402 | [% by mass] | 0 | 0 | 100 | 100 | 0 |
| | 8401 | [% by mass] | 30 | 0 | 0 | 0 | 0 |
| | KS571 | [% by mass] | 0 | 0 | 0 | 0 | 0 |
| | KC577T | [% by mass] | 0 | 0 | 0 | 0 | 100 |
| | Number of stretching axes | | 1 axis | 1 axis | 1 axis | un-stretched | 1 axis |
| | Thickness | [μm] | 3 | 3 | 3 | 10 | 3 |
| Second heat sealing layer | AC3100 | [% by mass] | 100 | 100 | 100 | 100 | 100 |
| | Ac | [% by mass] | 0 | 0 | 0 | 0 | 0 |
| | THS4884 | [% by mass] | 0 | 0 | 0 | 0 | 0 |
| | Binder | [% by mass] | 0 | 0 | 0 | 0 | 0 |
| | Thickness | [μm] | 0.15 | 0.15 | 0.15 | 0.15 | 0.15 |

| | | | | | | | |
|---|---|---|---|---|---|---|---|
| Resin container (PET) | Molding method | | Sb1 | Sb1 | Sb1 | Sb1 | Sb1 | Sb1 |
| Evaluation | Area dimension change rates of label $K_{10}$[%] | 80° C. | −1 | −1 | −1 | −1 | −1 | −1 |
| | | 90° C. | −1 | −1 | −1 | −1 | −1 | −1 |
| | Heat sealing layer fusion rates [%] | 80° C. | 62 | 62 | 42 | 51 | 48 | 64 |
| | | 90° C. | 74 | 74 | 60 | 61 | 58 | 76 |
| | | 100° C. | 81 | 81 | 76 | 96 | 89 | 85 |
| | Tack force [N/cm$^2$] | 80° C. | 0.30 | 0.39 | 0.35 | 0.60 | 0.36 | 0.78 |
| | | 90° C. | 0.61 | 0.70 | 0.67 | 0.90 | 0.70 | 1.11 |
| | | 100° C. | 1.21 | 1.55 | 1.41 | 2.90 | 1.33 | 2.20 |
| | Adhesive strength to container | [gf/15 mm] | 300 | 380 | 280 | 450 | 360 | 420 |
| | Area dimension change rates of resin container $K_{30}$[%] | 75° C. | 8.1 | 8.1 | 8.1 | 8.1 | 8.1 | 8.1 |
| | | 80° C. | 12.6 | 12.6 | 12.6 | 12.6 | 12.6 | 12.6 |
| | | 90° C. | 28.7 | 28.7 | 28.7 | 28.7 | 28.7 | 28.7 |
| | Label separation rates [%] | 75° C. water | 100 | 100 | 100 | 100 | 100 | 99 |
| | | 80° C. water | 100 | 100 | 100 | 100 | 100 | 100 |
| | | 90° C. water | 100 | 100 | 100 | 100 | 100 | 100 |
| | | 80° C. NaOH aqueous solution | 100 | 100 | 100 | 100 | 100 | 100 |
| | | 90° C. NaOH aqueous solution | 100 | 100 | 100 | 100 | 100 | 100 |

| | | | Sb1 | Sb1 | Sb1 | Sb1 | Sb1 |
|---|---|---|---|---|---|---|---|
| Evaluation | Area dimension change rates of label $K_{10}$[%] | 80° C. | −1 | −1 | −1 | −1 | −1 |
| | | 90° C. | −1 | −1 | −1 | −1 | −1 |
| | Heat sealing layer fusion rates [%] | 80° C. | 68 | 62 | 51 | 51 | 38 |
| | | 90° C. | 78 | 74 | 61 | 61 | 57 |
| | | 100° C. | 87 | 81 | 96 | 96 | 87 |
| | Tack force [N/cm$^2$] | 80° C. | 0.50 | 0.30 | 0.60 | 0.60 | 0.30 |
| | | 90° C. | 0.84 | 0.61 | 0.90 | 0.90 | 0.64 |
| | | 100° C. | 1.55 | 1.21 | 2.90 | 2.90 | 1.3 |
| | Adhesive strength to container | [gf/15 mm] | 400 | 300 | 350 | 370 | 340 |
| | Area dimension change rates of resin container $K_{30}$[%] | 75° C. | 8.1 | 8.1 | 8.1 | 8.1 | 8.1 |
| | | 80° C. | 12.6 | 12.6 | 12.6 | 12.6 | 12.6 |
| | | 90° C. | 28.7 | 28.7 | 28.7 | 28.7 | 28.7 |
| | Label separation rates [%] | 75° C. water | 98 | 100 | 100 | 100 | 100 |
| | | 80° C. water | 100 | 100 | 100 | 95 | 100 |
| | | 90° C. water | 100 | 100 | 100 | 93 | 100 |
| | | 80° C. NaOH aqueous solution | 100 | 100 | 100 | 96 | 100 |
| | | 90° C. NaOH aqueous solution | 100 | 100 | 100 | 94 | 100 |

TABLE 4

| Configuration | Detail | Composition | | Examples 9 | 10 | 11 | Comparative Examples 1 | 2 | 3 | 4 | 5 |
|---|---|---|---|---|---|---|---|---|---|---|---|
| | Substrate layer | PP | [% by mass] | 60 | 60 | 60 | 60 | 60 | 60 | 60 | 60 |
| | | PE | [% by mass] | 10 | 10 | 10 | 10 | 10 | 10 | 10 | 10 |
| | | 1800 | [% by mass] | 30 | 30 | 30 | 30 | 30 | 30 | 30 | 30 |
| | | Number of stretching axes | | 2 axes | 2 axes | 2 axes | 2 axes | 2 axes | 2 axes | 2 axes | 2 axes |
| | | Stretching temperature | [° C.] | 140 | 140 | 140 | 140 | 140 | 140 | 140 | 140 |
| | First heat sealing layer (uniaxially stretched) | EUL830 | [% by mass] | 100 | 100 | 100 | 0 | 0 | — | 100 | 100 |
| | | SP0450 | [% by mass] | 0 | 0 | 0 | 0 | 0 | | 0 | 0 |
| | | 8402 | [% by mass] | 0 | 0 | 0 | 0 | 0 | | 0 | 0 |
| | | 8401 | [% by mass] | 0 | 0 | 0 | 0 | 100 | | 0 | 0 |
| | | KS571 | [% by mass] | 0 | 0 | 0 | 100 | 0 | | 0 | 0 |
| | | Thickness | [μm] | 3 | 3 | 3 | 3 | 3 | | 3 | 3 |
| | Second heat sealing layer | AC3100 | [% by mass] | 100 | 100 | 100 | 0 | 100 | 80 | 0 | 100 |
| | | Ac | [% by mass] | 0 | 0 | 0 | 100 | 0 | 0 | 0 | 0 |
| | | THS4884 | [% by mass] | 0 | 0 | 0 | 0 | 0 | 0 | 100 | 0 |
| | | Binder | [% by mass] | 0 | 0 | 0 | 0 | 0 | 20 | 0 | 0 |
| | | Thickness | [μm] | 0.15 | 0.15 | 0.15 | 0.15 | 0.15 | 4 | 0.15 | 0.15 |
| Resin container (PET) | | Molding method | | Sb2 | Sb3 | Sb4 | Sb1 | Sb1 | Sb1 | Sb1 | Db |
| Evaluation | Area dimension change rates of label $K_{10}$[%] | | 80° C. | −1 | −1 | −1 | −1 | −1 | −1 | −1 | −1 |
| | | | 90° C. | −1 | −1 | −1 | −1 | −1 | −1 | −1 | −1 |
| | Heat sealing layer fusion rates [%] | | 80° C. | 62 | 62 | 62 | 48 | 81 | 68 | 62 | 62 |
| | | | 90° C. | 74 | 74 | 74 | 58 | 93 | 80 | 74 | 74 |
| | | | 100° C. | 81 | 81 | 81 | 89 | 100 | 98 | 81 | 81 |
| | Tack force [N/cm$^2$] | | 80° C. | 0.30 | 0.30 | 0.30 | 0.85 | 0.99 | 0.89 | 2.91 | 0.30 |
| | | | 90° C. | 0.61 | 0.61 | 0.61 | 1.35 | 3.59 | 1.80 | 3.60 | 0.61 |
| | | | 100° C. | 1.21 | 1.21 | 1.21 | 2.30 | 4.95 | 3.10 | 4.35 | 1.21 |
| | Adhesive strength to container | | [gf/15 mm] | 300 | 300 | 280 | 150 | 500 | 500 | 500 | 450 |
| | Area dimension change rates of resin container $K_{30}$ [%] | | 75° C. | 7.4 | 7 | 3 | 8.1 | 8.1 | 8.1 | 8.1 | 0 |
| | | | 80° C. | 9.4 | 9.5 | 6.7 | 12.6 | 12.6 | 12.6 | 12.6 | 0 |
| | | | 90° C. | 17.2 | 11 | 14.2 | 28.7 | 28.7 | 28.7 | 28.7 | 0 |
| | Label separation rates [%] | | 75° C. water | 99 | 96 | 94 | 54 | 98 | 72 | 45 | 0 |
| | | | 80° C. water | 100 | 100 | 100 | 63 | 90 | 80 | 49 | 0 |
| | | | 90° C. water | 100 | 100 | 100 | 67 | 0 | 85 | 62 | 0 |
| | | | 80° C. NaOH aqueous solution | 100 | 100 | 100 | 65 | 90 | 95 | 45 | 0 |
| | | | 90° C. NaOH aqueous solution | 100 | 100 | 100 | 73 | 0 | 94 | 60 | 0 |

As shown in Table 3 and Table 4, for Examples 1 to 14 in which the tack force at 80° C. is 0.8 N/cm or less, and the absolute value of the area dimension change rate at 80° C. is 1%, 100% of the labels can be peeled not only in the alkali aqueous solution at 80 to 90° C. but also in high temperature water at the temperatures. This is presumed to be because the tack force at 80° C. was low, and the absolute values of the area dimension change rates at 80° C. of the resin containers to which these labels adhered were 6% or more, and strong stress acted between the resin containers and the labels that hardly shrank, and the labels peeled easily.

In Example 13, a labeled container is manufactured using an in-mold label obtained without stretching a substrate layer and a first heat sealing layer. The unstretched film had lower rigidity than the stretched films, and when the resin container shrank, and curled so as to wrap the in-mold label, during high temperature immersion treatment, peeling due to repulsion was less likely to occur, and the label separation rates at higher temperatures tended to decrease.

Examples 4, 5, and 14 in which a resin having an equivalent melting point was used in the first heat sealing layer were compared. For Example 4, the fusion rate at 80° C. was low to a certain extent, and the tack force was low, and thus excellent label separation rates were obtained, and the fusion rate at 100° C. was high, and thus excellent adhesive strength was obtained. In contrast to this, for Examples 5 and 14, the fusion rate at 80° C. was low, and the tack force was low, and thus excellent label separation rates were obtained, but the fusion rate at 100° C. was lower than for Example 4, and the obtained adhesive strength was low.

On the other hand, for the thermoplastic resins used for the heat sealing layers of Comparative Examples 1 to 4, the temperature at which the tack force starts to increase is lower than for Examples 1 to 14, and the tack force exceeds 0.8 N/cm$^2$ at 80° C. and exceeds 1.3 N/cm$^2$ at 90° C. For Comparative Examples 2 to 4, the adhesive strength is also high. Therefore, the label separation rates are lower than for Examples 1 to 14. In Comparative Example 5, a resin container is obtained by direct blow molding. Therefore, it is presumed that even during heating, no shrinkage of the resin container occurred, no stress acted between the resin container and the label, and the label did not peel.

This application claims priority from Japanese Patent Application No. 2021-139343 filed on Aug. 27, 2021, and Japanese Patent Application No. 2022-17934 filed on Feb. 8, 2022, the entire contents of which are incorporated herein.

REFERENCE SIGNS LIST

10 in-mold label
1 substrate layer
2 heat sealing layer
21 first heat sealing layer 22 second heat sealing layer
30 resin container

The invention claimed is:

1. An in-mold label for being adhered to a resin container that is a stretch blow-molded body, the in-mold label having
an absolute value of an area dimension change rate of 1% or less at 80° C. and
a tack force of 0.8 N/cm² or less at 80° C.

2. The in-mold label according to claim 1, having a tack force of 1 N/cm² or less at 90° C.

3. The in-mold label according to claim 1, comprising:
a heat sealing layer that adheres to the resin container, wherein
the heat sealing layer contains a thermoplastic resin having a melting point of 90 to 110° C.

4. The in-mold label according to claim 3, wherein
the heat sealing layer comprises a first heat sealing layer, and a second heat sealing layer that adheres to the resin container, and
the first heat sealing layer contains a nonpolar resin having a melting point of 90 to 110° C.

5. The in-mold label according to claim 3, wherein
the heat sealing layer comprises a first heat sealing layer, and a second heat sealing layer that adheres to the resin container, and
the second heat sealing layer contains a polar resin having a melting point of 90 to 110° C.

6. The in-mold label according to claim 1, comprising:
a heat sealing layer that adheres to the resin container, wherein
a fusion rate of the heat sealing layer at 80° C. is 75% or less, and a fusion rate of the heat sealing layer at 100° C. is 70% or more.

7. A labeled container comprising:
a resin container that is a stretch blow-molded body; and
an in-mold label adhering to a surface of the resin container, wherein
an absolute value of an area dimension change rate of the in-mold label at 80° C. is 1% or less, and
a tack force of the in-mold label at 80° C. is 0.8 N/cm² or less.

8. The labeled container according to claim 7, wherein
an absolute value of an area dimension change rate of the resin container at 80° C. is 4% or more.

9. The labeled container according to claim 7, wherein
the in-mold label has a tack force of 1 N/cm2 or less at 90° C.

10. The labeled container according to claim 7, wherein
the in-mold label comprises a heat sealing layer that adheres to the resin container, and
the heat sealing layer contains a thermoplastic resin having a melting point of 90 to 110° C.

11. The labeled container according to claim 7, wherein
the in-mold label comprises a heat sealing layer that adheres to the resin container, and
a fusion rate of the heat sealing layer at 80° C. is 75% or less, and a fusion rate of the heat sealing layer at 100° C. is 70% or more.

12. The labeled container according to claim 11, wherein
the heat sealing layer comprises a first heat sealing layer, and a second heat sealing layer that adheres to the resin container, and
the first heat sealing layer contains a nonpolar resin having a melting point of 90 to 110° C.

13. The labeled container according to claim 11, wherein
the heat sealing layer comprises a first heat sealing layer, and a second heat sealing layer that adheres to the resin container, and
the second heat sealing layer contains a polar resin having a melting point of 90 to 110° C.

14. The labeled container according to claim 7, wherein
the in-mold label comprises a substrate layer, and
the substrate layer contains a propylene-based resin and an ethylene-based resin.

* * * * *